US007650365B2

(12) United States Patent
Launer et al.

(10) Patent No.: US 7,650,365 B2
(45) Date of Patent: Jan. 19, 2010

(54) SYSTEM AND METHOD FOR DELIVERING UPDATED DATA INFORMATION

(75) Inventors: Marc Launer, Darmstadt (DE); Jens Schiefele, Wiesbaden-Breckenheim (DE); Mathias Kühn, Frankfurt (DE); Christian Och, Liederbach (DE)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 11/613,353

(22) Filed: Dec. 20, 2006

(65) Prior Publication Data

US 2008/0155007 A1     Jun. 26, 2008

(51) Int. Cl.
*G06F 17/30* (2006.01)
*G06F 15/16* (2006.01)
*G05D 1/00* (2006.01)
*G01C 21/00* (2006.01)

(52) U.S. Cl. .................. 707/201; 707/104.1; 707/10; 701/1; 701/200; 709/217

(58) Field of Classification Search ............. 707/8, 707/10, 104.1, 201; 709/217; 701/1, 200
See application file for complete search history.

(56) References Cited

U.S. PATENT DOCUMENTS

| | | | | |
|---|---|---|---|---|
| 4,642,775 A | * | 2/1987 | Cline et al. ................ | 701/200 |
| 5,261,094 A | * | 11/1993 | Everson et al. ............. | 707/201 |
| 5,396,537 A | * | 3/1995 | Schwendeman ........... | 340/7.23 |
| 5,684,990 A | * | 11/1997 | Boothby .................... | 707/203 |
| 5,745,679 A | * | 4/1998 | Mercer ...................... | 707/203 |
| 5,768,528 A | * | 6/1998 | Stumm ...................... | 709/231 |
| 5,898,836 A | * | 4/1999 | Freivald et al. ............. | 709/218 |
| 2001/0044798 A1 | * | 11/2001 | Nagral et al. .............. | 707/102 |
| 2002/0065879 A1 | * | 5/2002 | Ambrose et al. ........... | 709/203 |
| 2007/0168120 A1 | | 7/2007 | Vandenbergh et al. | |

FOREIGN PATENT DOCUMENTS

WO    WO 9917200 A1 * 4/1999

OTHER PUBLICATIONS

Wikipedia, VHF Data Link, Jun. 18, 2009.*
Wikipedia, Aircraft Communications Addressing and Reporting System, Oct. 26, 2005.*
National Weather Service, METAR Data Access, Nov. 19, 2004.*

* cited by examiner

*Primary Examiner*—James Trujillo
*Assistant Examiner*—William Spieler
(74) *Attorney, Agent, or Firm*—Rozenblat IP LLC

(57) ABSTRACT

A data delivery system is provided for delivering updated data information from a sending database system to a receiving database system. The sending database system periodically obtains, from a database updating system, a new data set having both updated data objects and unchanged data objects relative to a loaded data set stored, for example, at a receiving database system. The sending database system performs individual validity checks on the updated data objects and the unchanged data objects. A master validity check is also performed by the sending database system on the individual validity checks for the updated data objects and the unchanged data objects. The individual validity checks and the master validity check may, for example, be cyclic redundancy checks. The receiving database system, such as a flight information system associated with an aircraft, receives the individual validity checks, the master validity check and the updated data objects delivered from the sending database system.

22 Claims, 2 Drawing Sheets

SYSTEM AND METHOD FOR DELIVERING UPDATED DATA INFORMATION

FIELD OF THE INVENTION

The present invention relates generally to computer-based systems for sending data updates and performing validity checks on received data information, and in particular to avionic flight information systems.

BACKGROUND OF THE INVENTION

In various data storage systems, updates to stored data are periodically required. For example, in flight information systems used in aircraft, navigation data and other aviation-related data is periodically updated. When updates to portions of a data set are made however, it is common to transmit a full data set having both unchanged data and updated data to the flight information system (such as a flight management system) of an aircraft. In many instances, only a small percentage of a total data set may include changes or updates while much of the data set to be transferred remains unchanged. For instance, in a standard AIRAC (Aeronautical Information Regulation and Control) cycle, approximately 7% to 10% of the full data set delivered may have changes.

In recent times, a broader selection of electronic applications have become available for use in aircraft avionics systems. However, the size and diversity of data used in the electronic applications pose difficulties in the area of data delivery. For example, a full set of applications for an EFB (electronic flight bag) for an aircraft may often require several gigabytes of data. Such large amounts of data provide difficulties in data delivery with lengthy load times as full data sets are transmitted for receipt and storage on aircraft systems at every cycle. Limitations in bandwidth and processing capabilities in conventional systems, such as aviation data delivery systems for example, present a need for alternative data update approaches. Furthermore, it is very important to ensure the validity of the data delivered to a receiving system. This is especially critical in aircraft or avionics computer systems. Thus, it is also desirable that such data update approaches, when used in avionics systems, meet certain industry standards such as DO178B or DO200A standards.

SUMMARY

A data delivery system is provided for delivering updated data information from a sending database system to a receiving database system. The sending database system periodically obtains, from a database updating system, a new data set having both updated data objects and unchanged data objects relative to a loaded data set stored, for example, at a receiving database system. The sending database system performs individual validity checks on the updated data objects and the unchanged data objects. A master validity check is also performed by the sending database system on all the individual validity checks for the updated data objects and the unchanged data objects. The individual validity checks and the master validity check may, for example, be cyclic redundancy checks. The receiving database system, such as a flight information system associated with an aircraft, receives the individual validity checks, the master validity check and the updated data objects delivered from the sending database system.

DETAILED DESCRIPTION

Figure 1:
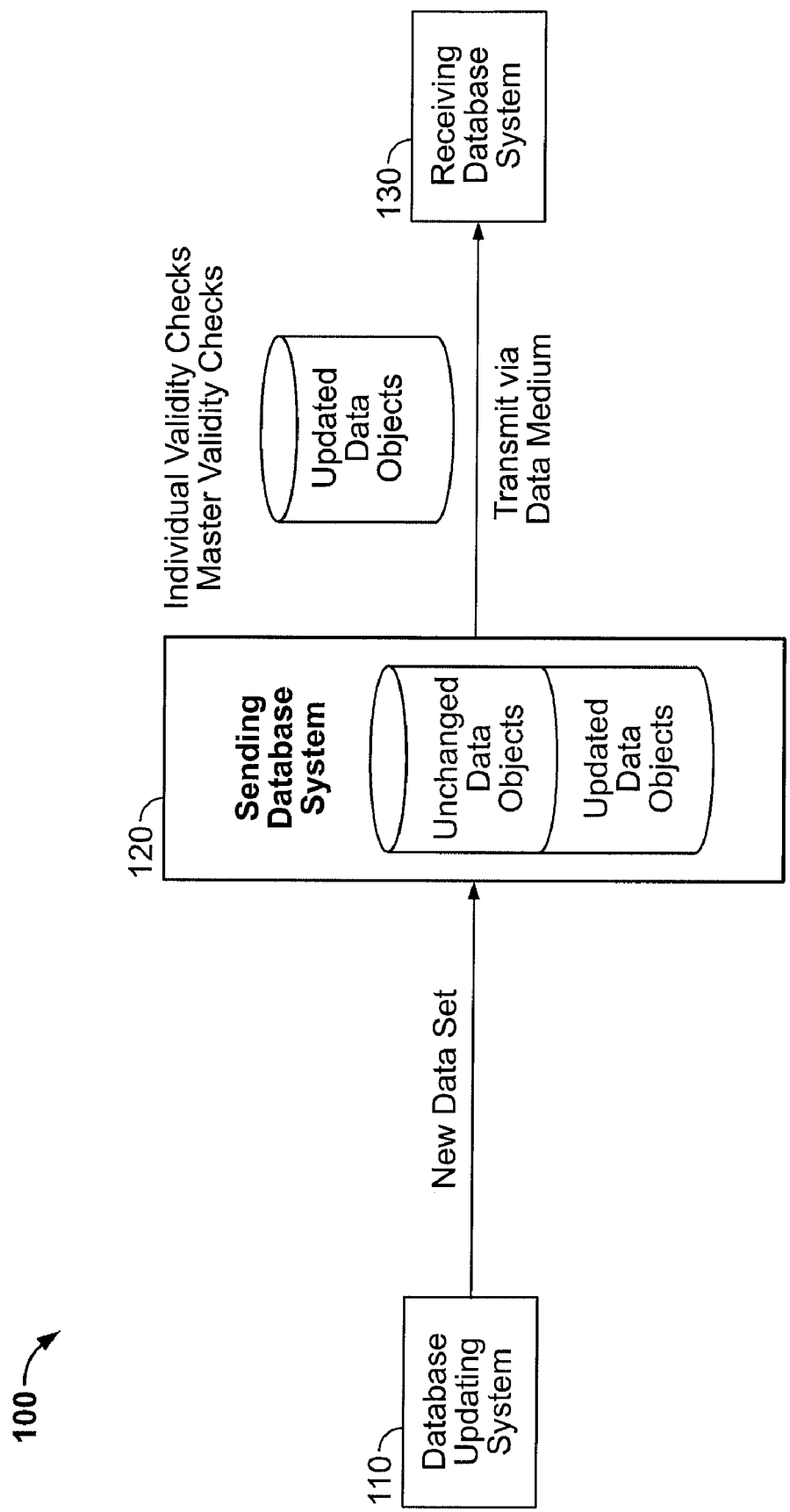
FIG. 1 depicts a system diagram for a data delivery system.

Referring to FIG. 1, data delivery system 100 for delivery data updates is shown with database updating system 110, sending database system 120 and receiving database system 130. Sending database system 120 periodically receives a new data set having both updated data objects and unchanged data objects. The new data set may be received from database updating system 110. The database updating system 110 may act as a data loader and may be any type of system for providing sets of data to sending database systems. For example, in the aviation field a database updating system may be associated with one or more offering groups that periodically provide updated data sets to be transmitted.

Upon receipt of a new data set, sending database system 120 performs individual validity checks on the updated data objects and the unchanged data objects. Additionally, sending database system 120 also performs a master validity check on all the individual validity checks for the updated data objects and the unchanged data objects. The sending database system 120 then delivers the individual validity checks, the master validity check, and the updated data objects to receiving data system 130. The unchanged data objects, which may comprise a significant amount of data, advantageously do not need to be sent to the receiving database system 130. Sending database system 120 may be any type of data storage and computing device. For example, any type of computer device or server capable of transmitting sets of data objects may be employed as a sending database system. For instance, in the aviation field, examples sending database systems may include: chart production and publishing systems, text publishing systems, navigation data production systems, airport data production systems, obstacle data production systems and the like. Alternatively, a system may be employed as sending database system that comprises many data types within one system to perform the task of identifying changed or unchanged data in comparison to the last known data set. In this example, the system would reside one step downstream to the above-mentioned systems in the aviation field.

The individual validity checks, the master validity check, and the updated data objects may be sent from sending database system 120 to receiving database system 130 over a data medium. Examples of data media that may be used include, but are not limited to: compact disks (CD), floppy disks, data distribution management (DDM), digital video disks DVDs, file transfer protocol (FTP), website downloads, universal serial bus (USB) devices, and the like. Receiving database system 130 may be any type of data storage and computer device, such as a personal computer, laptop computer, server or any other computer controlled device. In the aviation or avionics field, receiving database system 130 may, for example, be a flight information system. For instance, an onboard database server, electronic flight bag (EFB) system, multi-function display (MFD), or line replaceable unit (LRU) computer may be example receiving database systems in the aviation or avionics field.

Figure 2:
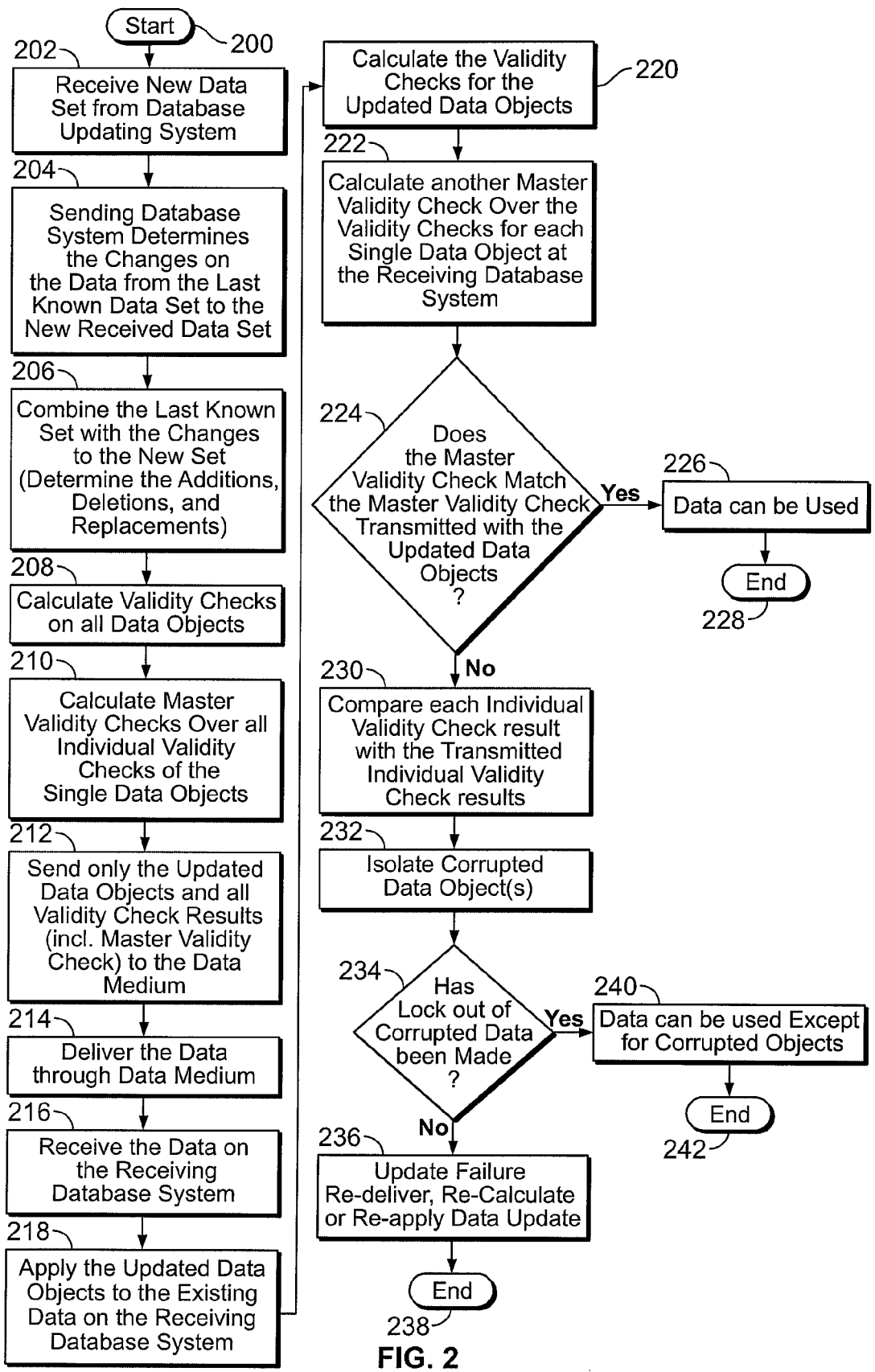
FIG. 2 is a flow diagram illustrating operation of the data delivery system for delivering and validating updated data information transmitted from a sending database system to a receiving database system.

Referring to FIG. 2, a flow diagram providing the operation of data delivery system 100 for delivering and validating updated data information transmitted from sending database system 120 to receiving database system is shown. Processing begins at step 200. In step 202, sending database system 120 receives, from database updating system 110, a new data set having both updated data objects and unchanged data objects relative to a loaded data set, such as a data set currently loaded the receiving database system 130 or the sending database system 120 obtained from a previous cycle. In step 204, sending database system 120 determines the changes on the data from the last known data set to the new data set received. The data sets may include any type of data. For instance, in the aviation or avionics field the data types that may be periodically updated may include: obstacle data, airport data, navigation data, terrain data, text data (documents), and the like. In step 206, the last known set is combined with the updates or changes to the new data set by the sending database system 120 in order to determine the additions, deletions and replacements.

In step 208, the sending database system 120 calculates individual validity checks on all data objects (i.e. the updated data objects and the unchanged data objects). Additionally, the sending database system 120, in step 210, calculates a master validity check on all the individual validity checks of the single data objects for the updated data objects and the unchanged data objects. The individual validity checks and the master validity check may be any type of data validity check such as cyclic redundancy checks (CRC). Alternatively, parity checks, binary comparison of multiple transmits, digest functions and the like may be used as validity checks. In step 212, only the updated data objects, the master validity check, and the individual validity checks are sent to the data medium. In step 214, the updated data objects, master validity check and the individual validity checks are delivered by the data medium to the receiving database system 130.

In step 216, the updated data objects along with the master validity check and the individual validity checks are received on the receiving database system 130. In step 218, the updated data objects are loaded into the receiving database system 130. The updated data objects are applied to the existing data on the receiving database system 130. In step 220, additional validity checks are performed, at the receiving database system 130, on the updated data objects after the updated data objects are delivered. For example, cyclic redundancy checks may be calculated for each of the updated data objects transmitted to the receiving database system 130. Individual validity checks are performed on all data objects at the receiving database system 130. In step 222, another master validity check is performed over all validity checks for each data object at the receiving database system 130. The master validity check is calculated over the validity checks performed at the receiving database system 130 for each single data object at the receiving database system.

In step 224, the receiving database system 130 compares the master validity check performed at the sending database system 120 with the master validity check performed at the receiving database system 130. A determination is made to see if the master validity check calculated at the receiving database system 130 matches the master validity check transmitted (from the sending database system 120) with the updated data objects. If the master validity check calculated at the receiving database system 130 matches the master validity calculated at the sending database system then in step 226, the receiving database system 130 determines that a successful delivery of the updated data objects has been made and the data may be used. Processing then ends at step 228. If the master validity check performed at the receiving database system 130 does not match the master validity check performed at the sending database system 120, then in step 230, each individual validity check calculated at the receiving database system 130 is compared with the individual validity checks delivered from the sending database system 120.

In step 232, corrupted data objects are identified and locked out/isolated by the receiving database system 130. In step 234, the receiving database system 130 determines if a lock out of corrupted data has been made. If a lock out of corrupted data has not been made, then in step 236, it is determined that a failure has occurred in the delivery of the updated data objects. The system 100 re-delivers, re-calculates or re-applies the updated data objects. Processing ends at step 238. If a lock out of corrupted data has been made, then in step 240, the delivered data objects can be used except for the corrupted data objects. The processing ends at step 242.

The foregoing description of the preferred embodiments of the invention have been presented for purposes of illustration and description, and are not intended to be exhaustive or to limit the invention the precise forms disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of delivering data updates in a data delivery system comprising:

a sending database system receiving a new data set which was sent from a database updating system, wherein the new data set comprises both updated data objects and unchanged data objects relative to a loaded data set loaded on at least one of a receiving database system and the sending database system, and both the updated data objects and the unchanged data objects were sent by the database updating system and are received by the sending database system;

performing, at the sending database system, individual validity checks on the updated data objects and the unchanged data objects;

performing, at the sending database system, a master validity check on the individual validity checks for the updated data objects and the unchanged data objects; and delivering the individual validity checks, the master validity check and the updated data objects, but not the unchanged data objects, from the sending database system to the receiving database system.

2. The method of claim 1 further comprising performing, at the receiving database system, additional individual validity checks on the updated data objects after delivery of the updated data objects to the receiving database system.

3. The method of claim 2 further comprising loading the updated data objects into the receiving database system.

4. The method of claim 2 further comprising performing, at the receiving database system, another master validity check over all validity checks for each data object at the receiving database system.

5. The method of claim 4 further comprising comparing the master validity check performed at the sending database system with the other master validity check performed at the receiving database system.

6. The method of claim 5 further comprising determining that a successful delivery of the updated data objects has been made to the receiving database system if the master validity check performed at the sending database system matches the other master validity check performed at the receiving database.

7. The method of claim 6 wherein the individual validity checks and the master validity checks are cyclic redundancy checks (CRCs).

8. The method of claim 6 wherein the receiving database system is a flight information system associated with an aircraft.

9. The method of claim 5 wherein if the master validity check performed at the receiving database system does not match the master validity check performed at the sending database system, further comprising comparing each of the individual validity checks performed on the updated data objects at the receiving database system with each of the individual validity checks performed at the sending database system.

10. The method of claim 9 further comprising the receiving database system identifying and isolating corrupted data objects.

11. The method of claim 1 further comprising performing individual validity checks on all data objects at the receiving database system; and comparing each individual validity check performed at the receiving database system with the individual validity checks delivered from the sending database system.

12. A data delivery system for delivering updated data information comprising:
a sending database system configured to receive a new data set sent from a database updating system, wherein the new data set has both updated data objects and unchanged data objects relative to a loaded data set loaded on at least one of a receiving database system and the sending database system, and the sending database system is configured to receive both the updated data objects and the unchanged data objects sent by the database updating system, the sending database system is configured to perform individual validity checks on the updated data objects and the unchanged data objects, the sending database system is configured to perform a master validity check on the individual validity checks for the updated data objects and the unchanged data objects, and the sending database is configured to deliver the individual validity checks, the master validity check, and the updated data objects, but not the unchanged data objects, to a receiving database system;
wherein the receiving database system is configured to received the individual validity checks, the master validity check, and the updated data objects, but not the unchanged data objects, from the sending database system.

13. The data delivery system of claim 12 wherein the receiving database system is configured to perform additional individual validity checks on the updated data objects after delivery to the receiving database system.

14. The data delivery system of claim 13 wherein the updated data objects are loaded into the receiving database system.

15. The data delivery system of claim 13 wherein the receiving database system is configured to perform another master validity check over all validity checks for each data object at the receiving database system.

16. The data delivery system of claim 15 wherein the data delivery system is configured to compare the master validity check performed at the sending database system with the other master validity check performed at the receiving database system.

17. The data delivery system of claim 16 wherein the receiving database system is configured to determine that a successful delivery of the updated data objects has been made to the receiving database system if the master validity check performed at the sending database system matches the other master validity check performed at the receiving database system.

18. The data delivery system at claim 17 wherein the individual validity checks and the master validity checks are cyclic redundancy checks.

19. The data delivery system of claim 17 wherein the receiving database system is a flight information system associated with an aircraft.

20. The data delivery system of claim 16 wherein if the other master validity check performed at the receiving database system does not match the master validity check performed at the sending database system, the data delivery system is configured to compare each of the additional individual validity checks performed on the updated data objects at the receiving database system with each of the individual validity checks performed at the sending database system.

21. The data delivery system of claim 20 wherein the receiving database system is configured to identify and isolate corrupted data objects.

22. The data delivery system of claim 12 wherein the receiving database system is configured to perform validity checks on all data objects at the receiving database system and to compare each individual validity check performed at the receiving database system with the individual validity checks delivered from the sending database system.

* * * * *